US011399456B2

(12) United States Patent
Martin et al.

(10) Patent No.: US 11,399,456 B2
(45) Date of Patent: Aug. 2, 2022

(54) ROW CLOSING ASSEMBLIES

(71) Applicants: Ronald Steve Martin, Elkton, KY (US); Brandon Dwayne Hunt, Herndon, KY (US)

(72) Inventors: Ronald Steve Martin, Elkton, KY (US); Brandon Dwayne Hunt, Herndon, KY (US)

(73) Assignee: Ronald Steve Martin, Elkton, KY (US)

( * ) Notice: Subject to any disclaimer, the term of this patent is extended or adjusted under 35 U.S.C. 154(b) by 0 days.

(21) Appl. No.: 16/947,033

(22) Filed: Jul. 15, 2020

(65) Prior Publication Data
US 2021/0100157 A1 Apr. 8, 2021

Related U.S. Application Data

(63) Continuation-in-part of application No. 16/593,765, filed on Oct. 4, 2019, now Pat. No. 11,246,253.

(51) Int. Cl.
*A01C 5/06* (2006.01)
*A01C 7/08* (2006.01)

(52) U.S. Cl.
CPC ............... *A01C 5/068* (2013.01); *A01C 7/08* (2013.01)

(58) Field of Classification Search
CPC ........... A01B 5/00; A01C 5/066; A01C 5/068; A01C 7/08
USPC ...................................................... 172/538
See application file for complete search history.

(56) References Cited

U.S. PATENT DOCUMENTS

| | | | | |
|---|---|---|---|---|
| 3,878,901 | A * | 4/1975 | Robertson, Sr. ....... | A01B 63/22 172/413 |
| 7,975,629 | B1 * | 7/2011 | Martin ................... | A01C 5/066 111/52 |
| 9,408,337 | B2 * | 8/2016 | Sauder .................... | A01B 5/04 |
| 9,609,802 | B2 * | 4/2017 | Needham ............... | A01C 5/068 |
| 10,251,337 | B2 * | 4/2019 | Conrad ................. | A01C 23/047 |
| 2013/0333599 | A1 * | 12/2013 | Bassett .................. | A01C 5/066 111/62 |
| 2014/0034344 | A1 * | 2/2014 | Bassett .................. | A01C 7/203 172/705 |
| 2016/0150714 | A1 * | 6/2016 | Unruh ................... | A01B 49/02 111/140 |
| 2016/0374258 | A1 * | 12/2016 | Schaffert ............... | A01C 5/066 172/773 |
| 2019/0297774 | A1 * | 10/2019 | Hamilton .............. | A01C 5/068 |
| 2020/0077569 | A1 * | 3/2020 | Sivinski ................ | A01C 5/066 |
| 2020/0107486 | A1 * | 4/2020 | Martin .................. | A01C 5/066 |
| 2020/0214192 | A1 * | 7/2020 | Martin .................. | A01C 5/068 |
| 2020/0337217 | A1 * | 10/2020 | Hodel .................... | A01C 5/066 |
| 2021/0100158 | A1 * | 4/2021 | Martin .................. | A01C 7/006 |
| 2021/0204466 | A1 * | 7/2021 | Barker .................. | A01B 63/24 |

* cited by examiner

*Primary Examiner* — Gary S Hartmann
(74) *Attorney, Agent, or Firm* — Duncan Galloway; Greenwald PLLC; Kevin T. Duncan

(57) ABSTRACT

A row planting unit closing system, the system comprising: a first stage closing unit adapted to be attached to a row planting unit and comprising: a first stage frame; and a set of at least one row closing wheel having a closing angle orientation non-perpendicular relative to the ground; and wherein the first stage frame is attached at a first end to the row planting unit, the first stage frame comprising a linkage mechanism for setting a toe in angle orientation of the set of at least one row closing wheel relative to the first stage frame.

17 Claims, 12 Drawing Sheets

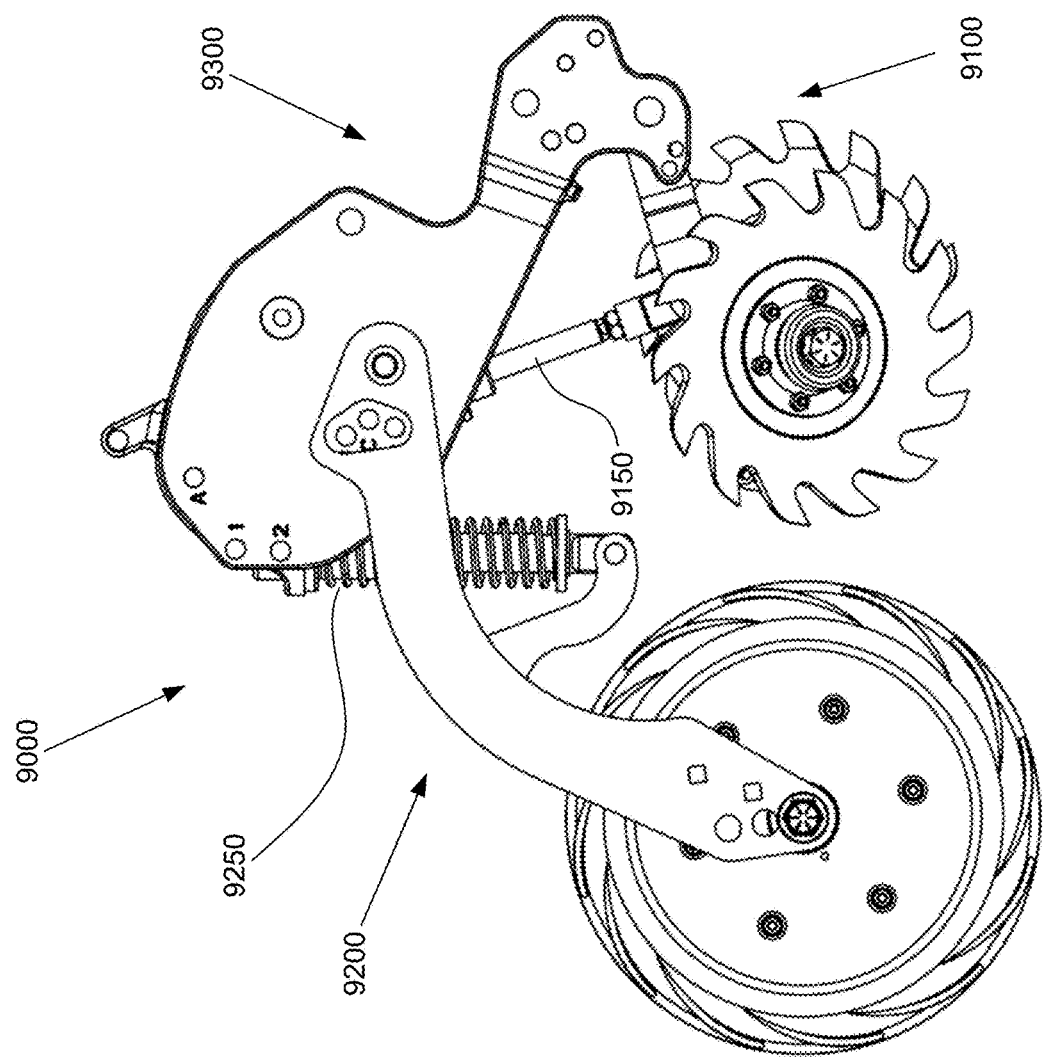
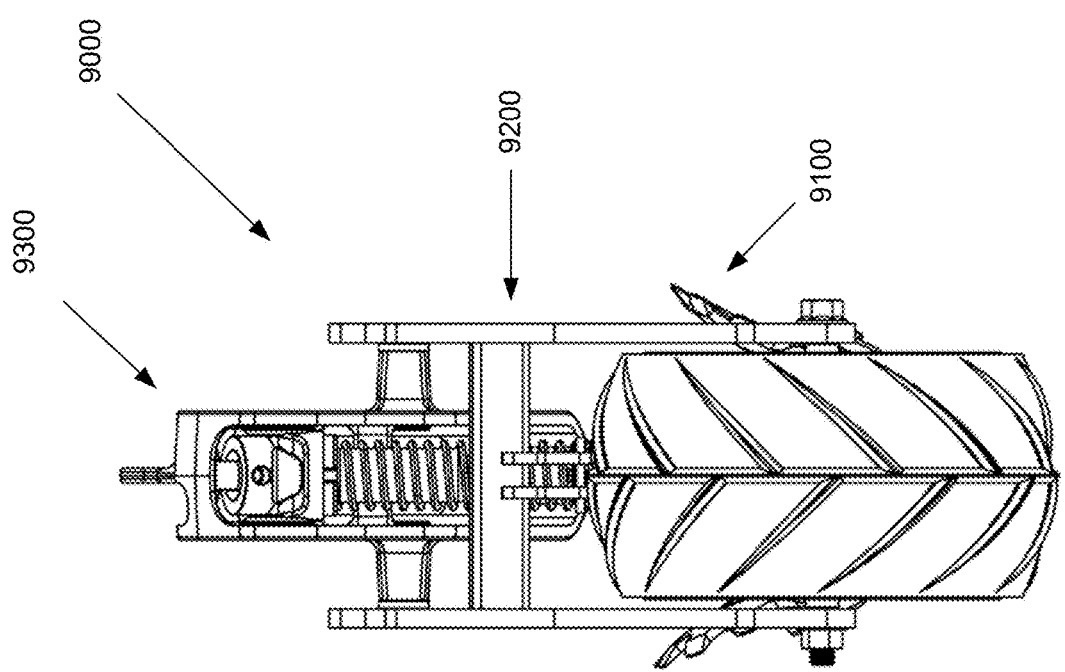
Fig. 9
Fig. 8

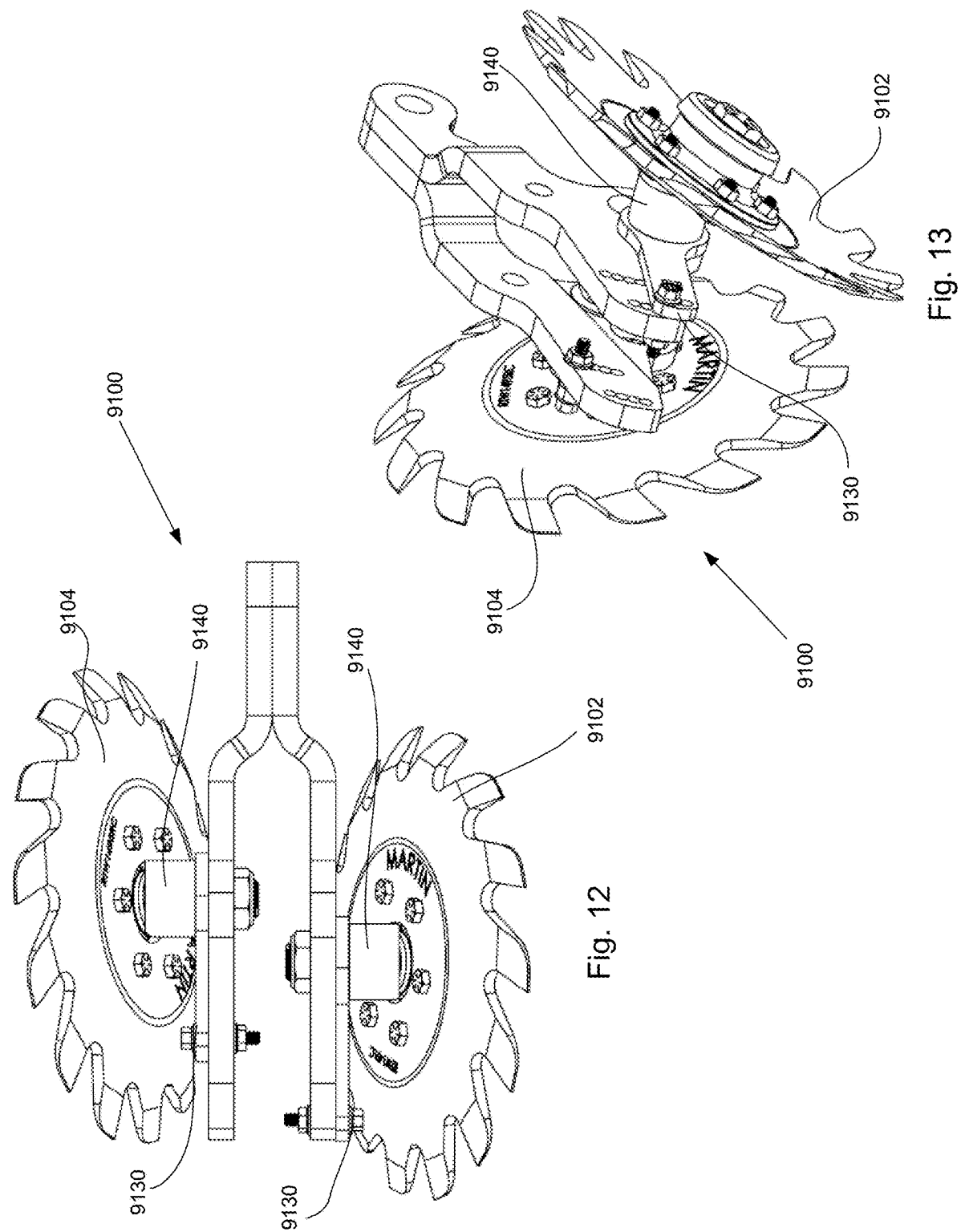

ROW CLOSING ASSEMBLIES

CROSS-REFERENCE AND CLAIM OF PRIORITY

The present application is a continuation-in-part of and claims benefit of priority to U.S. patent application Ser. No. 16/593,765, entitled COMPACT PARALLEL ARM ROW CLOSER AND ROW CLEANER, filed 4 Oct. 2019, by Martin et al., which is incorporated by reference herein in its entirety.

FIELD OF THE INVENTION

The present disclosure is generally applicable to the field of agricultural equipment, and more particularly for improved row closing and row cleaning in no-till farming applications and for improved row cleaning and for the closing of seed troughs.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used at the front or leading portion of a planter row unit to clear only a small portion or strip of earth of the residue to enable seeds and fertilizer to be placed in the ground in connection with a coulter or other tillage tool. The row cleaner removes the residue and only very lightly tills the topmost soil or earth to provide for a clear path for seed and fertilizer placement. One key aspect to row cleaner operation is to maintain necessary clearance between the row cleaner and the coulter or other tillage tool for terrain responsive operation. Also, at the trailing end of the planter row unit closing wheels are used to close the seed slot opened during row planting operation. This operation is known as row closing and may comprise multiple stages or steps in the closing operation including a first closing operation by a set of closing wheels and a second closing operation by a second closing means.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners. However, these existing row cleaner systems have drawbacks. Fixed row cleaners do not follow or track changes in land elevation as the planter moves over a field. Adjustable and floating row cleaners may not possess the ideal geometry with respect to a planter to provide for optimal row cleaning action by the cleaner wheel assemblies. Additionally, after seeds have been planted the open planted row need to be closed. Existing row closing assemblies comprise similar drawbacks and limitations to those of existing row cleaners. Namely, existing row closing assemblies do not maintain an ideal desired geometry for closing wheels as the closing wheels and row closing assembly travel over terrain. Moreover, existing row closing assemblies do not provide for independent vertical travel of first and second stage row closing operations to accommodate for changes in soil height and condition along a planted row or across all row closing units on a row planter.

For example, as the row closing wheel assemblies of the prior art travel down a row, they may rise and fall with changes in row elevation. However, these changes in elevation cause a change in the geometry, or orientation, of the row closing wheels relative to the row being closed. If the closing wheel assembly is at too low of an angle, the closing action of the wheel assembly may be considered "negative" as opposed to the desired "positive" closing action of a level closing wheel assembly. Prior art closing wheel assemblies can be centered over an open row or seed slot where seeds have been planted. However, most cannot be adjusted at all, or if they can be adjusted they cannot be adjusted to compensate for changes in elevation over a row or seed slot.

A 13" spading closing wheel is 1" greater in diameter than a standard smooth closing wheel. This is by design to allow the wheels to engage the soil and effectively close the seed slot. When working in looser soils, the spading closing wheels frequently engage the soil deeper than in firmer soils. To help reduce this excessive soil engagement, down pressure may need to be reduced, e.g., to a minimum setting, by adjusting the angle of the entire closing wheel assembly. Greater down pressure settings tend to lower the rear of the closing wheel arm assembly, which reduces the gathering action of the two spading closing wheels. Additionally, separate closing means on a single row unit may need to operate or move independently of one another to accommodate for changes in soil height or condition and existing row closing units cannot do so.

Existing row cleaning and closing units are described in at least U.S. patent application Ser. No. 16/593,765, entitled COMPACT ROW CLOSER AND ROW CLEANER ASSEMBLIES, filed 4 Oct. 2019, Martin et at.; U.S. Prov. Pat. App. No. 62/741,438, entitled COMPACT PARALLEL ARM ROW CLOSER AND ROW CLEANER, filed 4 Oct. 2018, Martin et al.; U.S. Prov. Pat. App. 62/803,420, entitled IMPROVED ROW CLEANER/CLOSING WHEEL, filed 8 Feb. 2019, Martin et al.; and U.S. Prov. Pat. App. No. 62/804,208, entitled IMPROVED ROW CLOSING WHEEL ASSEMBLY, filed 11 Feb. 2019, Martin et al., each of which are incorporated by reference herein in their entirety.

What is needed is a compact row closing assembly and/or row cleaning assembly that can both follow or track changes in land elevation and maintain an optimal geometry or angle with respect to the planter or plater system to provide for optimal row cleaning operation and/or positive row closing action with minimal soil engagement and down pressure.

Another problem with existing row closer wheel designs is that the relative angle of the wheels with respect to the frame can be difficult to change for any given set of closer wheels.

SUMMARY OF THE INVENTION

To address the issues identified hereinabove and to provide further improvements to row closing assemblies, the present invention provides a two-stage row closing system comprising a first stage row closing assembly and a second stage row closing assembly. The first stage row closing assembly comprises a set of row closing wheels disposed on a frame. The frame may be a frame having a T-handle and spring assembly for adjusting a down pressure or engagement depth for a set of closing wheels, or may be a floating frame having a spring, spring and shock, pneumatic or fluid actuator, or electro-mechanical actuator for adjusting the down pressure or engagement depth for a set of closing wheels. Either frame may further comprise lever-adjustable hubs for changing the "toe in" or angle of engagement of the closing wheels with soil.

The second stage row closing assembly comprises a swing arm or firming wheel frame for mounting a firming wheel or second stage closing wheel relatively behind the first stage row closing assembly. The frame of the second stage row closing assembly positions a second stage row closer, which may be a press wheel, a firming wheel, set of cog wheels, drag chain, set of plastic spiked wheels, or other suitable second stage closing means.

The present invention further provides a closing wheel assembly adapted or configured to provide for the adjustment of the orientation of closing wheels with respect to the furrow. The closing wheel assembly consists of a single lever adjustment assembly or independent first and second lever adjustment assemblies that are pivotally mounted to the axle assembly and may move relative to the adjustable closing wheel frame. One end of the lever forms a handle and the opposite end attaches to a single axle, the axle having angled ends for attaching a set of closing wheels on a set of corresponding hubs. Angle notches or axle securing points are provided on a securing point arm or portion of the frame to secure the lever in a desired position, which consequently secures the closing wheels and axle attached to that angle lever in a desired orientation. If the closing wheels are angled with respect to the furrow in either the vertical or horizontal planes, adjusting the lever may compensate for orientation changes in the closing wheels due to changes in penetration depth of the closing wheels.

The levers provide an interface through which the angle of a set of closing wheels on an adjustable closing wheel frame may be re-oriented with respect to the ground. The relative toe-in, camber, and/or angle of penetration of the closing wheels on the single axle may be adjusted by manipulating a lever and securing it one of a plurality of locking points on the adjustable closing wheel frame.

The present invention further provides a firming wheel frame and a row closing wheel frame for use with a row planting unit. The firming wheel frame and row closing wheel frame provide for the use of a single lever angle adjustment or independent lever angle adjustment on row closing wheels with certain row planter unit types, such as those produced by Case IH. The firming wheel frame positions the firming wheel to the rear of the row planter unit and clear of the closing wheel frame and closing wheels. The firming wheel frame is also angled to provide access to row planter unit adjustments on the row planter unit. The row closing wheel frame is positioned relatively forward of the row planting unit and the position and height of the frame may be adjusted by a pneumatic or hydraulic system, such as by a locally or remotely controlled actuator. The firming wheel frame and the closing wheel frame are shaped such that they do not interfere with the operation of the row planter unit, the firming wheel, or with each other, and the firming wheel frame and the closing wheel frame are independently adjustable through the firming wheel suspension, row cleaner adjustment actuator, and row planting unit factory adjustment features.

In the present invention, the row closing wheels may be positioned on a common rotating axis or may be positioned on offset or independent axes. Positioning the row closing wheels on an offset axis provides for the pushing of material through the teeth of the row cleaning wheels and allows for material to flow through the wheels. In some soil and moisture conditions, having the closing wheels on a common axis can cause material to be picked up and dropped instead of closing a seed trough or furrow as desired. The co-axial wheels may "fight" or counteract each other instead of providing a complementary closing action.

Additionally, separately mounting the closing wheels and having the closing wheels on separate axes provides for the independent adjustment of the angle of the closing wheels, which may be desirable in some soil conditions. The types of closing wheels used with the cleaning and closing wheel frames as disclosed herein may be changed to properly suit soil conditions and closing or cleaning wheel types may be "mixed-and-matched" to provide for optimum results. For example, a smooth wheel may be used with a razor wheel, a razor wheel may be used with a spike wheel, and any other combination of one or more wheels may be used to provide the desired cleaning or closing action. This enables the wheels to best match the soil conditions. Additionally, increasing the angle, toe-in, or camber of the wheels relative to their engagement with the ground may be said to provide a more "aggressive" engagement with the soil which is desirable in moist or wet soil conditions. Having a less "aggressive" engagement with the soil may be desirable in drier soil conditions.

In a first embodiment, the present invention provides a row planting unit closing system, the system comprising: a first stage closing unit adapted to be attached to a row planting unit and comprising: a first stage frame; and a set of at least one row closing wheel having a closing angle orientation non-perpendicular relative to the ground; and wherein the first stage frame is attached at a first end to the row planting unit, the first stage frame comprising a linkage mechanism for setting a toe in angle orientation of the set of at least one row closing wheel relative to the first stage frame.

The system of the above embodiment may further comprise, wherein the linkage mechanism comprises at least one lever secured to a row closing wheel hub adapted to provide an adjustable toe in orientation of the set of at least one row closing wheel. The hub may comprise a first face relatively parallel to the frame and a second face disposed at an angle relative to the first face. The second face of the hub may be adapted to support a row closing wheel from the set of at least one row closing wheel. The set of at least one row closing wheel may comprise a first and second row closing wheel, the first and second row closing wheels being configured to provide a V-shape closing angle orientation relative to the ground. The first and second row closing wheels may operate on opposite sides of a furrow to cause a closing action on the furrow by compression of soil on the opposite sides of the furrow. The system may further comprise, wherein repositioning of the at least one lever of the linkage mechanism results in re-orientation of the set of at least one row closing wheel relative to the frame to effect a change in the toe in angle orientation. The first stage frame may further comprise: a set of securing points for securing the lever in a desired position; and a plurality of mounting points for mounting the linkage mechanism and the set of at least one row closing wheel. The toe in angle orientation and the closing angle orientation may be fixed. The system may further comprise, wherein one or both of the toe in angle orientation and the closing angle orientation are adjustable. The toe in angle orientation may adjustable and the first stage frame may further comprise a set of cutouts for preventing the set of at least one row closing wheel from contacting the first stage frame when the toe in angle orientation is adjusted. The first stage frame may further comprise a set of suspension mounting points for securing and supporting a first stage frame biasing mechanism. The first stage frame may be pivotally mounted to the row planting unit at the first end and is disposed beneath the row planting unit. The first stage frame may comprise a first frame member and a second frame member, each of the first frame member and the second frame member having a first end proximate the row planting unit and commonly secured at the respective first ends to the row planting unit, and wherein the first frame member and the second frame member each comprise an angled portion such that distal ends of the respective first and second frame members are separated. The system may further comprise a second stage closing unit comprising a second stage frame and a second stage closing wheel. The second stage frame may be adapted to support the second stage closing wheel and further comprises a set of cutouts adapted to permit access to a set of features on the row planting unit. The second stage frame may further comprise a set of parallel frame arms and a suspension mount, the suspension mount adapted to transfer force from a biasing mechanism to the second stage closing wheel.

BRIEF DESCRIPTION OF THE FIGURES

In order to facilitate a full understanding of the present invention, reference is now made to the accompanying drawings, in which like elements are referenced with like numerals. These drawings should not be construed as limiting the present invention, but are intended to be exemplary and for reference.

In order that the advantages of the cleaning wheel will be readily understood, a more particular description of the assemblies briefly described above will be rendered by reference to specific embodiments illustrated in the appended drawings. Understanding that these drawings depict only typical embodiments of the cleaning wheel and are not therefore to be considered limited of its scope, the assemblies will be described and explained with additional specificity and detail through the use of the accompanying drawings.

FIG. 1 provides a side-view of a row planter with closing section in accordance with a first embodiment of the present invention.

FIG. 2 provides a partially exploded perspective view of the closing section of the embodiment of FIG. 1.

FIG. 3 provides a perspective view of the closing wheel section of the embodiment of FIG. 1

FIG. 4 provides an exploded perspective view of the closing wheel section of the embodiment of FIG. 1

FIG. 5 provides a perspective view of the closing wheel frame of the embodiment of FIG. 1.

FIG. 6 provides a top-down view of the closing wheel frame of the embodiment of FIG. 1.

FIG. 7 provides a side view of the closing wheel frame of the embodiment of FIG. 1.

FIGS. 8-14 provide various views of a row closing/planting system on a row unit of a row planter using a second stage or firming wheel frame and a first stage or closing wheel frame assembly according to an embodiment of the present invention, more specifically:

FIG. 8 provides a rear view of the closing system in connection with the embodiment of FIG. 1.

FIG. 9 provides a side view of the closing system of FIG. 8.

FIG. 10 provides a bottom-up view of the closing system of FIG. 8.

FIG. 11 provides an exploded perspective view of the closing wheel frame assembly of the embodiment of FIG. 1.

FIG. 12 provides a top-down view of the closing wheel frame assembly of the embodiment of FIG. 1.

FIG. 13 provides a perspective view of the closing wheel frame assembly of the embodiment of FIG. 1.

FIG. 14 provides a perspective view of the second stage closing section of the closing system of FIG. 8.

DETAILED DESCRIPTION

Figure 1:
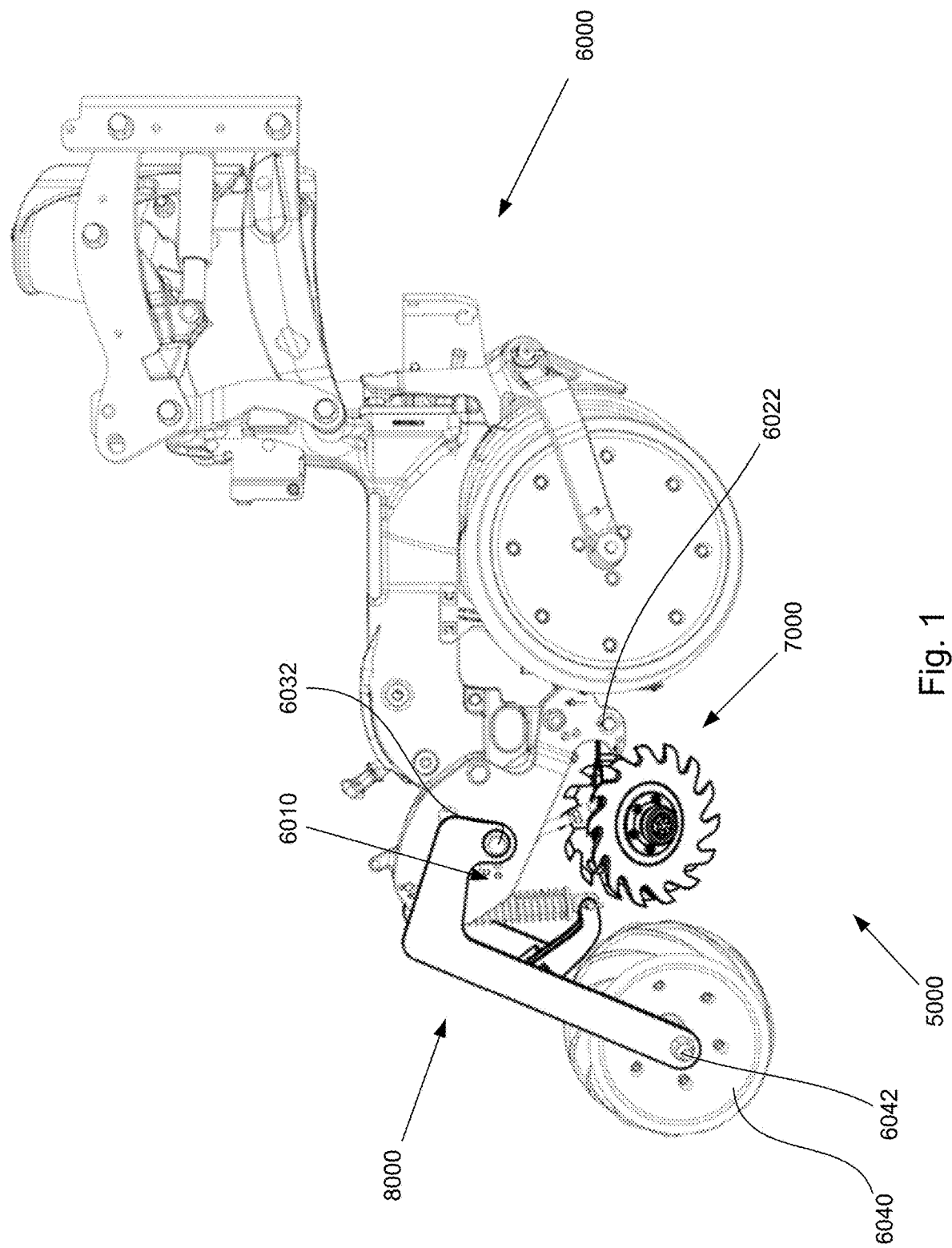
FIGS. 1-7 provide various views of a row closing/planting system using a firming wheel frame and closing wheel frame assembly according to an embodiment of the present invention on a row planting unit, more specifically.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, "fastener" may mean any suitable fastening means such as a nut and bolt, a rivet, or a pin and cotter pin. Typically, as used herein a fastener refers to a threaded bolt, which may have a hexagonal bolt head, secured by a correspondingly threaded nut having a hexagonal outer surface, wherein one or more washers may be used to permit movement of a fastened object about the bolt. In some embodiments, a locking nut may be used to further secure the nut to the bolt and to prevent the nut from backing off of the threads of the bolt.

With reference now to FIGS. 1-7, various views of a two-stage row closing/planting system 5000 using a second stage row closing unit comprising a firming wheel frame 8000 and a first stage row closing unit comprising a closing wheel frame assembly 7000 according to an embodiment of the present invention on a row planting unit 6000 are provided. The firming wheel frame 8000 and closing wheel frame assembly 7000 are installed on the row planting unit 6000 using existing bracketry mounting points to provide for the installation of the firming wheel frame 8000 and closing wheel frame assembly 7000 without modification to the row planting unit 6000. The shape or geometry of the firming wheel frame 8000 is designed such that it may be installed on the row planting unit 6000 while providing for access to and use of the factory adjustment features 6010 of the row planting unit 6000. Additionally, the shape or geometry of the closing wheel frame assembly 7000 is such that it may be used below the row planting unit 6000 without interfering with operation of the row planting unit 6000.

With reference to FIG. 1, the firming wheel frame 8000 is installed or attached to the rear of the row planter unit 6000 at the attachment points 6032, where it may be secured by a fastening means, such as by a nut and a bolt, to the row planter unit 6000 in a manner to provide for rotational movement about the attachment point 6032. This provides for movement of the firming wheel 6040 at the end of the firming wheel frame 8000 to allow the firming wheel 6040 to follow changes in ground elevation or angle while the row planter unit 6000 is in operation. The closing wheel frame assembly 7000 is installed or attached underneath the row planter unit 6000 and forward of the firming wheel frame 8000 at the attachment point 6022 where it is secured by a fastening means, such as by a nut and a bolt, to the row planter unit 6000. The closing wheel frame assembly 7000 is secured in a manner to provide for rotational movement about the attachment point 6022 such that the closing wheels may follow changes in ground elevation or angle while the row planter unit 6000 is in operation.

Figure 2:
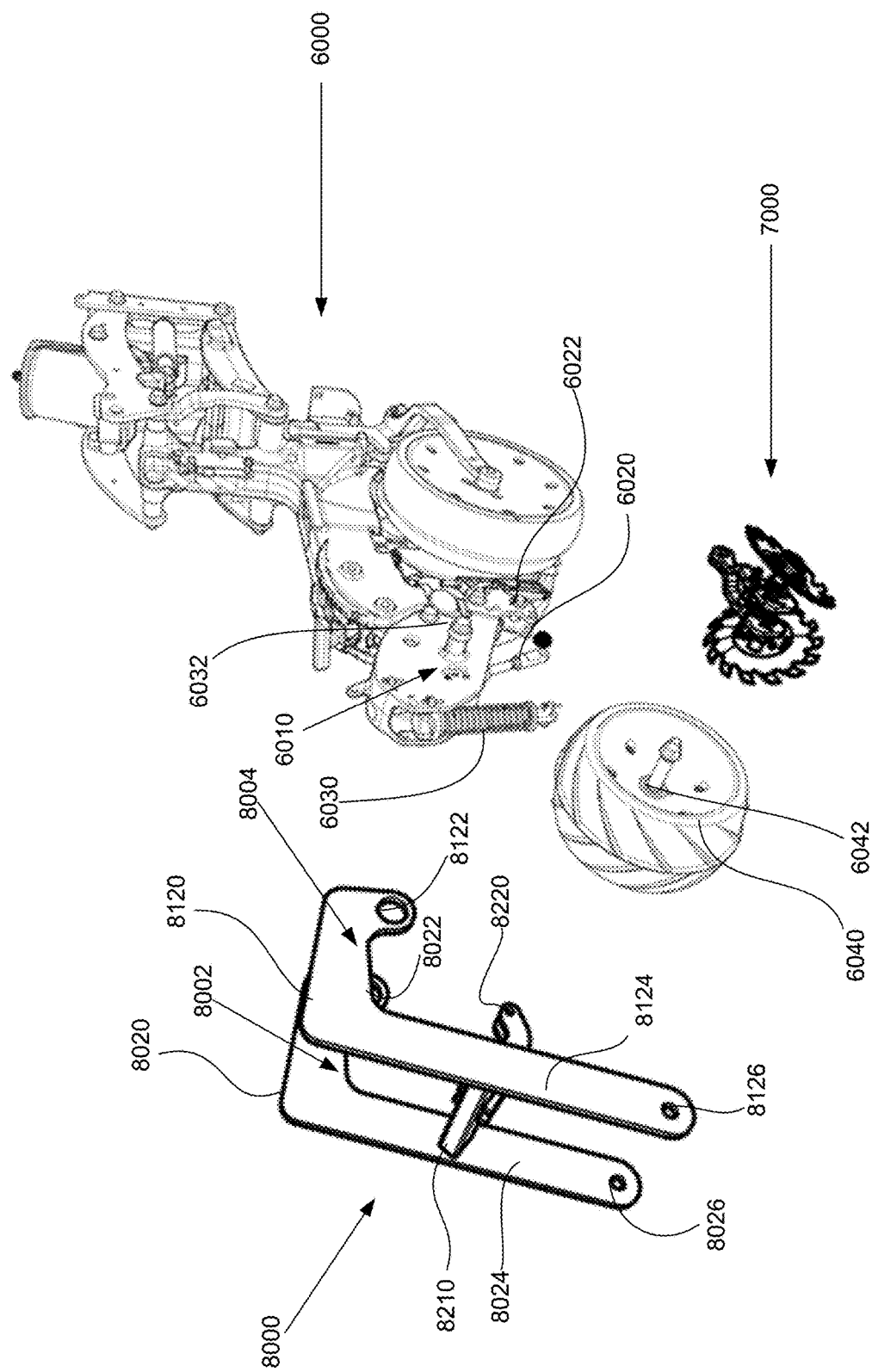
Figure 3:
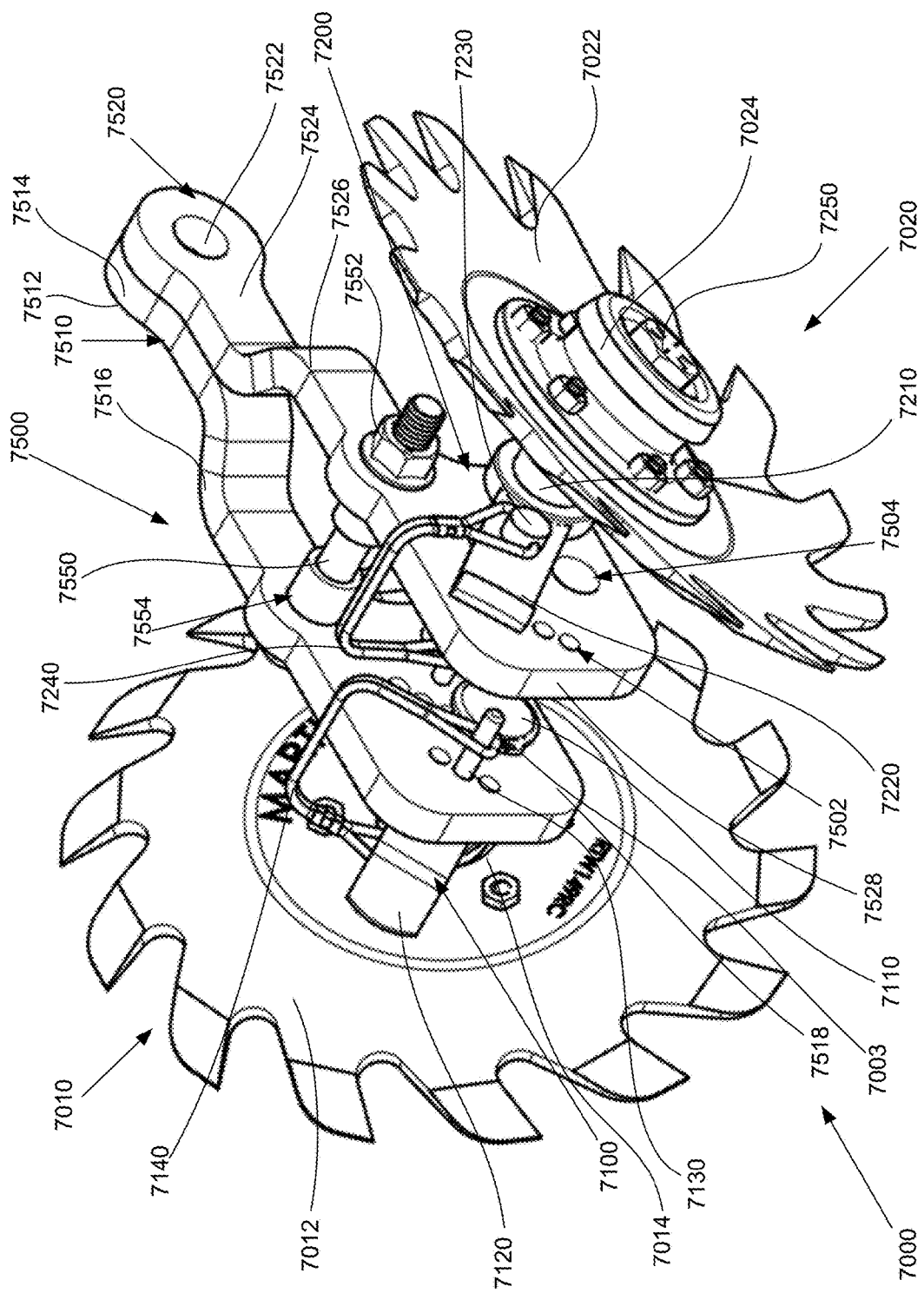
Figure 4:
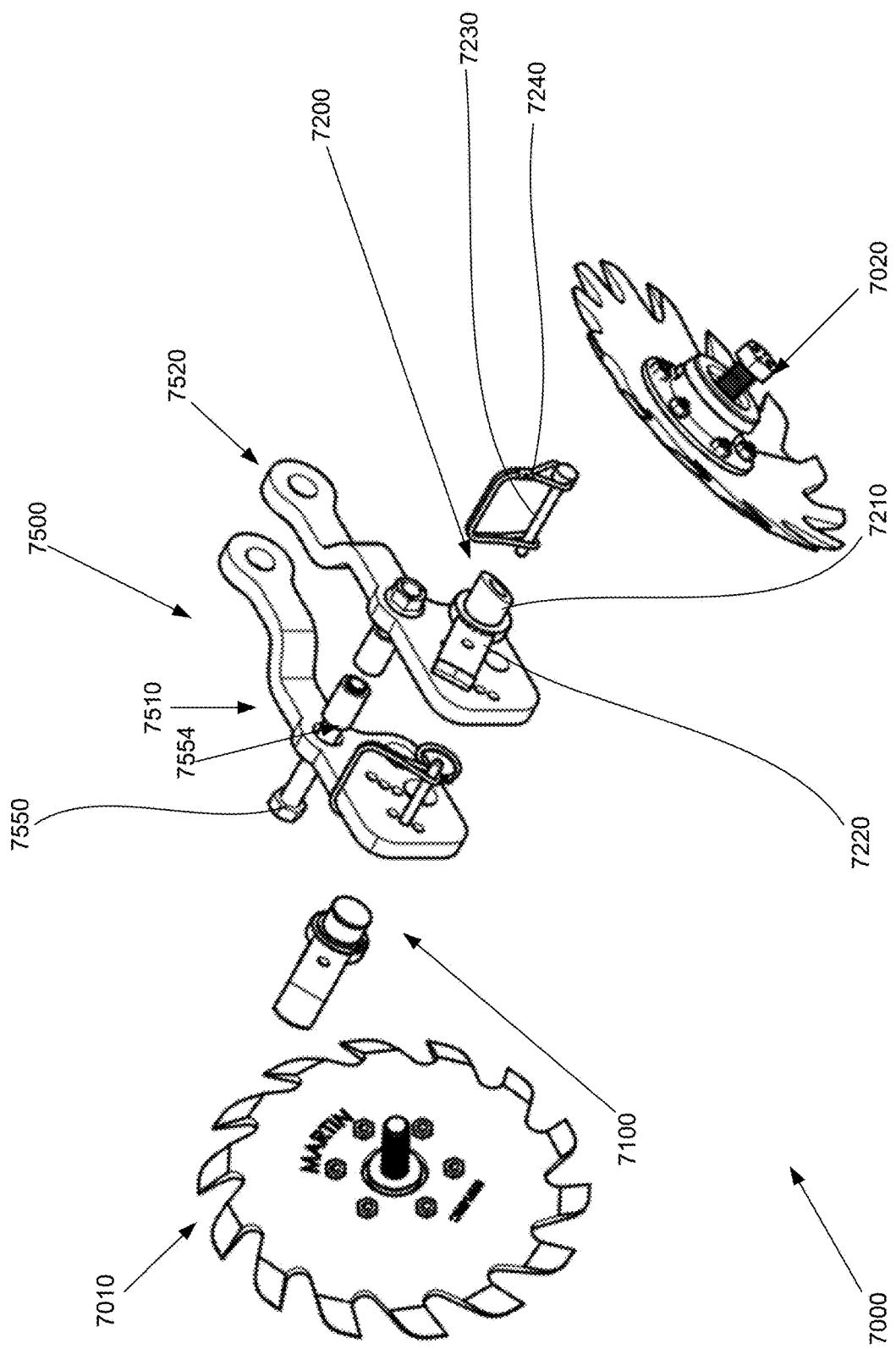
Figure 5:
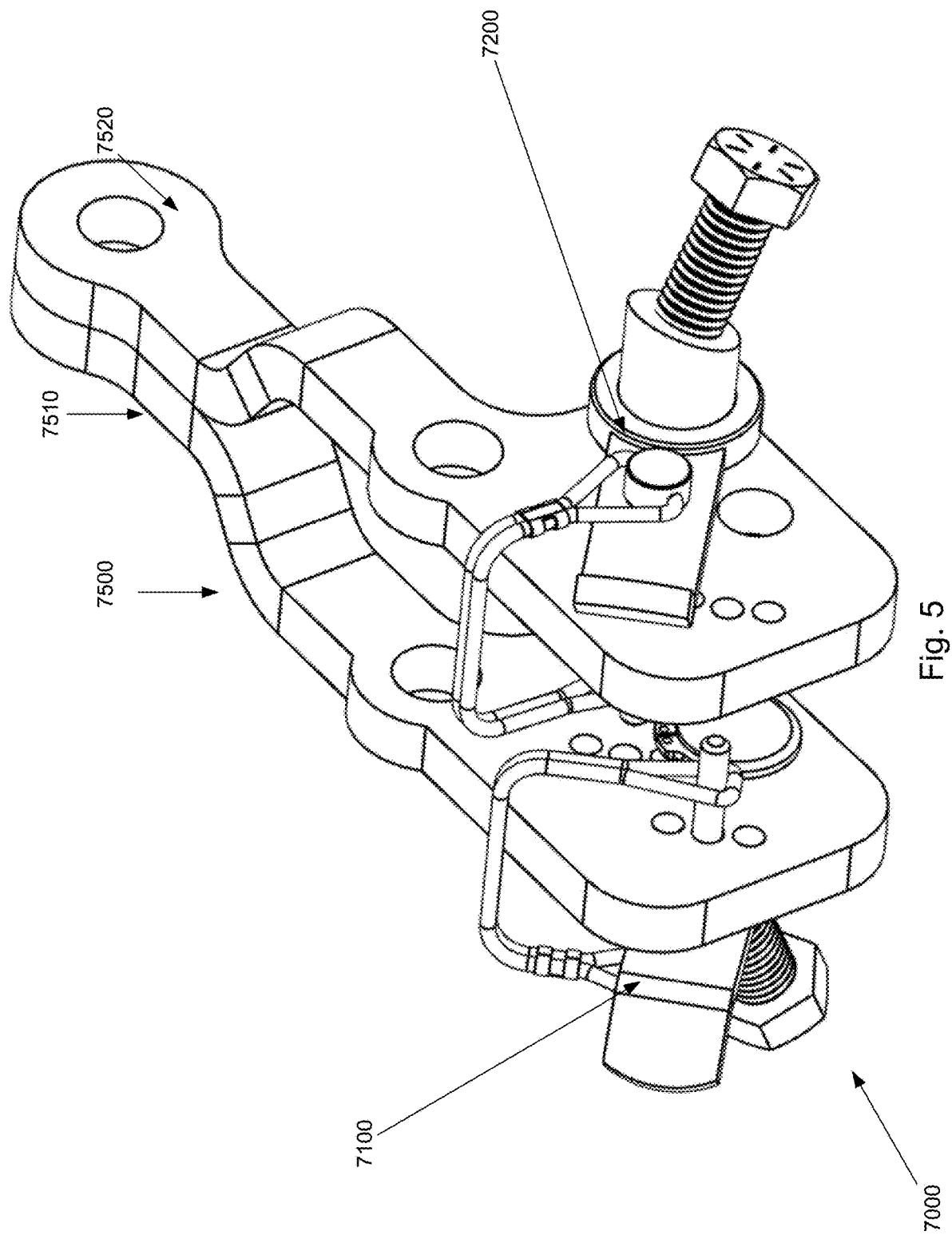
Figure 6:
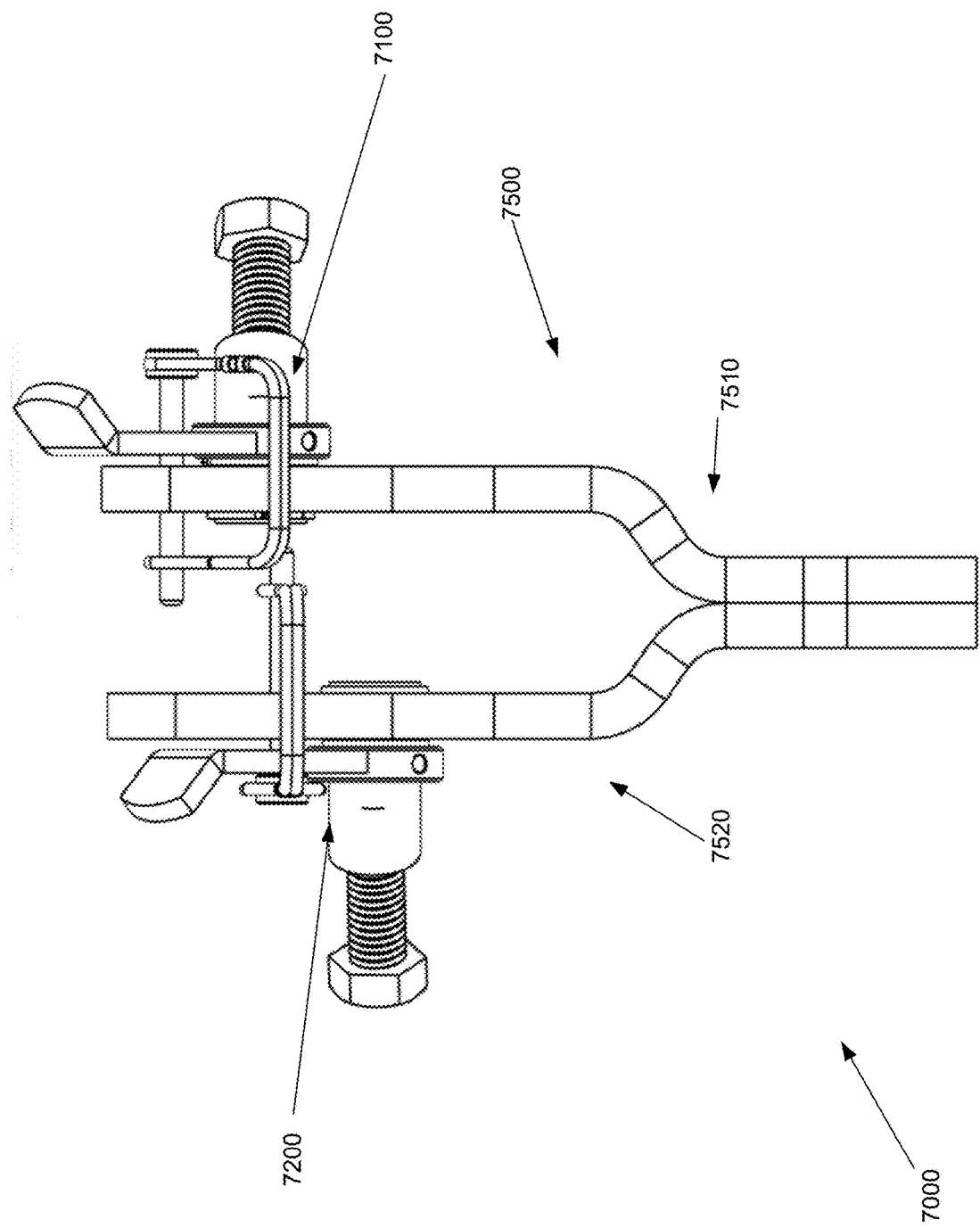
Figure 7:
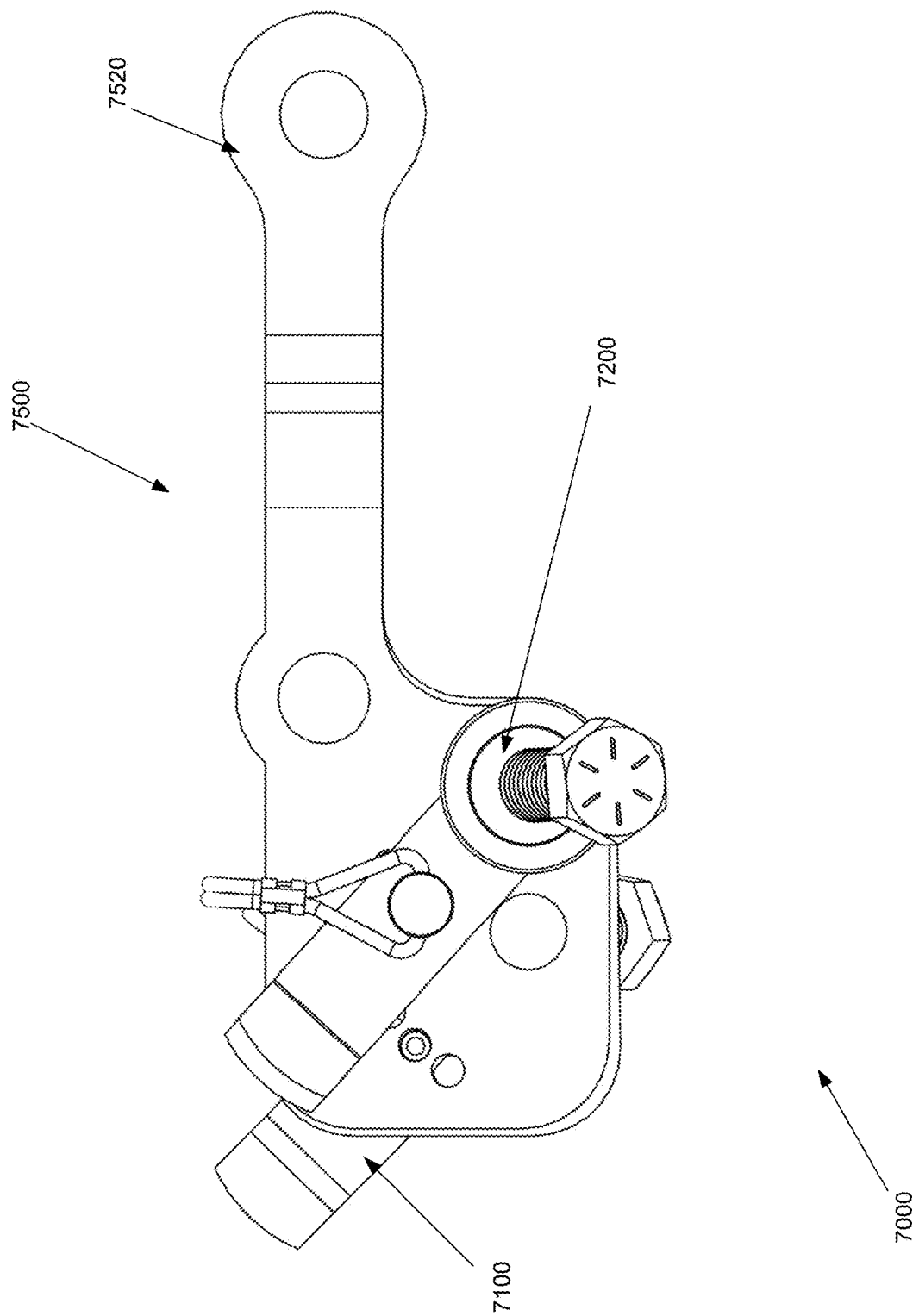
Figure 10:
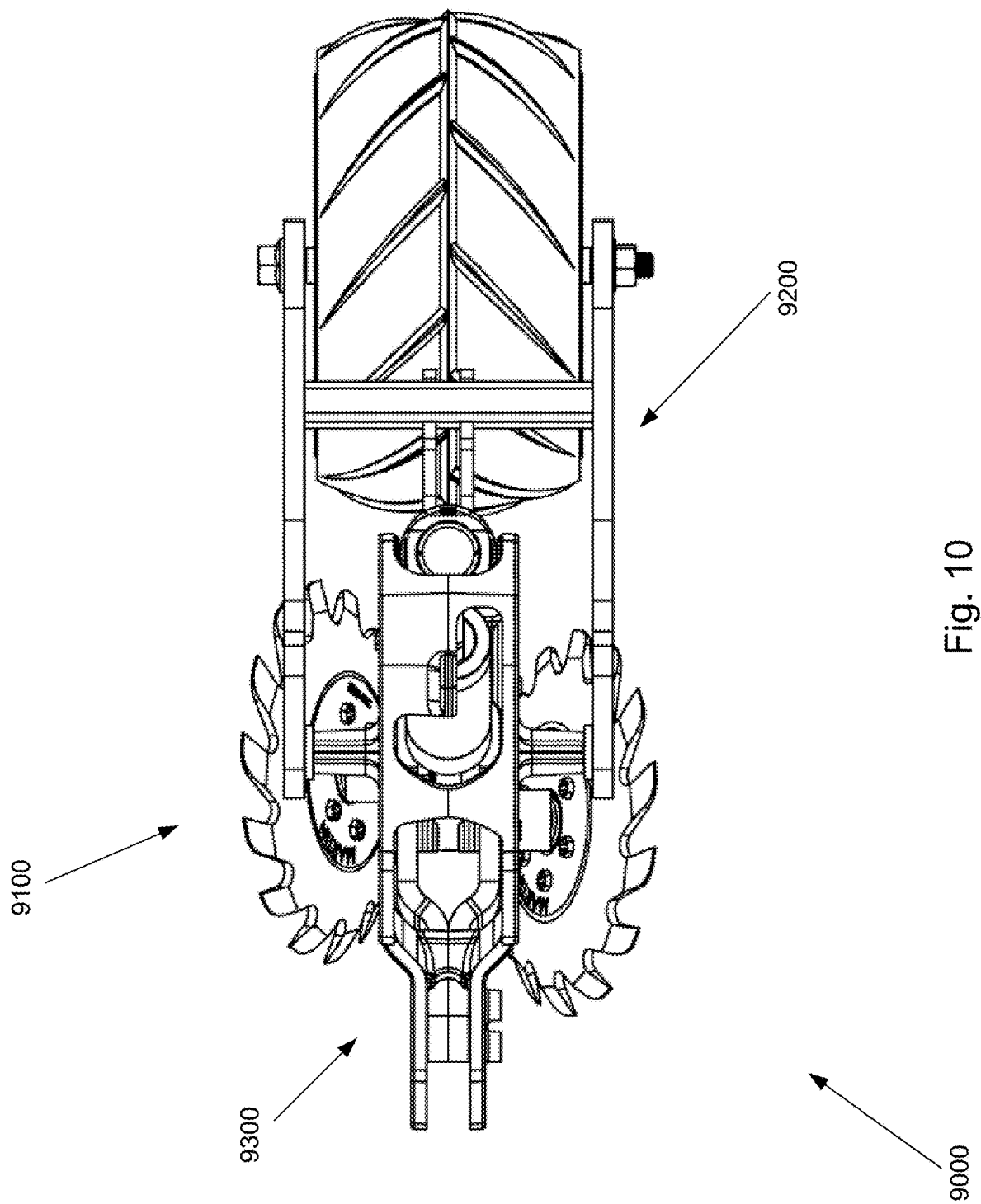

With reference to FIG. 2, a perspective view of components of the row closing/planting system 5000 are shown. Specifically, the firming wheel frame 8000 is shown separate from the row planter unit 6000 and in detail. The firming wheel frame 8000 comprises a first arm 8002 and a second arm 8004 which are disposed parallel to each other and each is disposed on one side of the row planter unit 6000. Apertures or openings 8022 and 8122 provide for the mounting of the firming wheel frame 8000 to the row planter unit 6000 at the mounting points such a mounting point 6032 such that the firming wheel frame 8000 may rotatably move about the mounting point 6032 when secured by a suitable fastening means such as a nut and threaded stud, a bolt, or a single bolt with a nut and washers. Bends 8020 and 8120 in the respective first arm 8002 and second arm 8004 angle the frame over factory adjustment features on the row planter unit 6000 providing for user access to and operation of those adjustment features.

Wheel arms 8024 and 8124 extend out from the row planter unit 6000 to position the firming wheel 6040 clear of the closing wheels and closing wheel frame assembly 7000. The firming wheel 6040 is attached to the frame 8000 at the mounting points 8026 and 8126 by to the axle 6042 by suitable fastening means. A brace 8210 provides structural support to the firming wheel frame 8000 and keeps each of the first arm 8002 and second arm 8004 properly positioned and oriented with respect to each other, the firming wheel 6040, and to the row planter unit 6000. A suspension 6030, which may be a shock absorber and spring suspension, a hydraulic suspension, an air suspension, or an actuator, is attached to the firming wheel frame 8000 at the suspension arm 8220. The suspension 6030 provides the proper downward pressure on the firming wheel 6040 and also provides for the adjustment of the travel, rate-of-travel, and pressure for the firming wheel 6040.

With reference now to FIGS. 3-7, views of the closing wheel frame assembly 7000, with and without closing wheel assemblies 7010 and 7020 are provided. The closing wheel frame assembly 7000 comprises a closing wheel frame 7500 having a first frame arm 7510 and a second frame arm 7520. The first frame arm 7510 has a proximal end 7514 with an attachment point 7512 for securing the first frame arm 7510 to the mounting point 6022 of the row planter unit 6000. This may also secure the first frame arm 7510 to the second frame arm 7520 or the arms may be welded together or may be formed from a single piece of material. A bend 7516 positions the first arm 7510 out from a common central plane to provide for securing an adjustment actuator 6020 to the axle or bolt 7550. Bushings or collars 7554 may be used with the bolt 7550 and a nut 7552 to secure the adjustment actuator 6020 to the closing wheel frame 7500. The bend 7516 also provides access to the wire lock 7140 and pin 7130 of the adjustment assembly 7100. The second frame arm 7520 has a proximal end 7524 with an attachment point 7522 for securing the second frame arm 7520 to the mounting point 6022 of the row planter unit 6000. This may also secure the second frame arm 7520 to the first frame arm 7510. A bend 7526 positions the first arm 7520 out from a common central plane to provide for securing the adjustment actuator 6020 to the axle or bolt 7550. The bend 7526 also provides access to the wire lock 7240 and pin 7230 of the adjustment assembly 7200. The adjustment actuator 6020 is used to adjust the position of the closing frame 7500 and/or the pressure or level of engagement of the wheel assemblies 7010 and 7020 with the ground or soil.

A first closing wheel assembly 7010 comprises a closing wheel 7012 and a closing wheel hub 7014, and a second closing wheel assembly 7020 comprises a closing wheel 7022 and a closing wheel hub 7024. The first closing wheel assembly 7010 is secured to first adjustment assembly 7100 of the first arm 7510 and the second closing wheel assembly 7020 is secured to the second adjustment assembly 7200 of the second arm 7510.

The angle of the closing wheel assemblies 7010 and 7020 may be adjusted by the respective adjustment assembly 7100 and adjustment assembly 7200 to change the angle of engagement of the closing wheels 7012 and 7022 with the soil or ground as desired. Increasing the angle, toe-in, or camber of the wheels relative to their engagement with the ground may be said to provide a more "aggressive" engagement with the soil which is desirable in moist or wet soil conditions. Having a less "aggressive" engagement with the soil may be desirable in drier soil conditions. Additionally, the closing wheel assemblies 7010 and 7020 and the adjustment assemblies 7100 and 7200 may be installed at one of a plurality of mounting points 7504. This provides for the closing wheel assemblies 7010 and 7020 and the adjustment assemblies 7100 and 7200 to share a common axis or to be mounted in an offset configuration to provide benefits in different soil conditions. Mounting the closing wheel assemblies 7010 and 7020 and the adjustment assemblies 7100 and 7200 in an offset configuration provides for improved row closing action for a seed trough or furrow in certain soil conditions, such as with wet, moist, or clumping soils.

The adjustment assembly 7200 comprises an adjustment lever and collar 7220 secured to a shaft 7210 which may be held in place by a locking ring, such as the locking ring 7003. Changing the angle of the lever and collar 7220 changes the angle of engagement of the wheel assembly 7020 with the ground and may be set by placing the pin 7230 in one of the plurality of locating holes 7502 and securing the pin 7230 with the wire lock 7240. The adjustment assembly 7100 comprises an adjustment lever and collar 7120 secured to a shaft 7110 which may be held in place by a locking ring, such as the locking ring 7003. Changing the angle of the lever and collar 7120 changes the angle of engagement of the wheel assembly 7010 with the ground and may be set by placing the pin 7130 in one of a plurality of locating holes, such as locating holes 7502, and securing the pin 7130 with the wire lock 7140. The angle of each of the adjustment assemblies 7100 and 7200 may be adjusted independently to provide for optimal soil engagement and closing action for varying soil conditions.

With reference now to FIGS. 8-14, views of a two-stage closing system 9000 comprising a first stage closing unit 9100 and second stage closing unit 9200 mounted on a row unit 9300 are provided. The two-stage closing system 9000 is similar to the two-stage closing system 5000 shown in FIGS. 1-7 but the configuration of the second stage closing unit 9200 and first stage closing unit 9100 have been adapted to the specific row unit 9300 to provide advantages when used with the row unit 9300. With specific reference to FIGS. 8-10, the first stage closing unit 9100 is disposed beneath the frame of the row unit 9300 and operates to close a furrow or seed trench used in row planting operations. The shape and position of the first stage closing unit 9100 provides for the upwards and downwards travel of the first stage closing unit 9100 relative to the row unit 9300 as it traverses over soil. The second stage closing unit 9200 is positioned relatively behind the first stage closing unit 9100 and operates to perform a second stage closing operation after the first stage closing operation of the first stage closing unit 9100.

The first 9100 and second stage 9200 closing units operate to first close and then further treat, tamp, compress, or close the furrow or seed trench. The first stage 9100 and second stage 9200 closing units may be separately biased towards the ground to apply down pressure and to provide for soil engagement by the respective down pressure systems 9150 and 9250. The biasing system 9150 may be a fluid (e.g., pneumatic or hydraulic) actuator, an electro-mechanical actuator, or a spring and shock suspension system adapted to provide a down pressure on the first stage closing unit 9100. The biasing system 9250 may be a fluid (e.g., pneumatic or hydraulic) actuator, an electro-mechanical actuator, or a spring and shock suspension system adapted to provide a down pressure on the first stage closing unit 9200. The biasing systems 9150 and 9250 may be independently adjusted, may be grouped or "ganged" together, or may be grouped or "ganged" together with other biasing systems on other row units such that the down pressure for each of the biasing systems may be independently or jointly adjusted or configured at the biasing system or centrally by an operator or computer operated control system.

Figure 11:
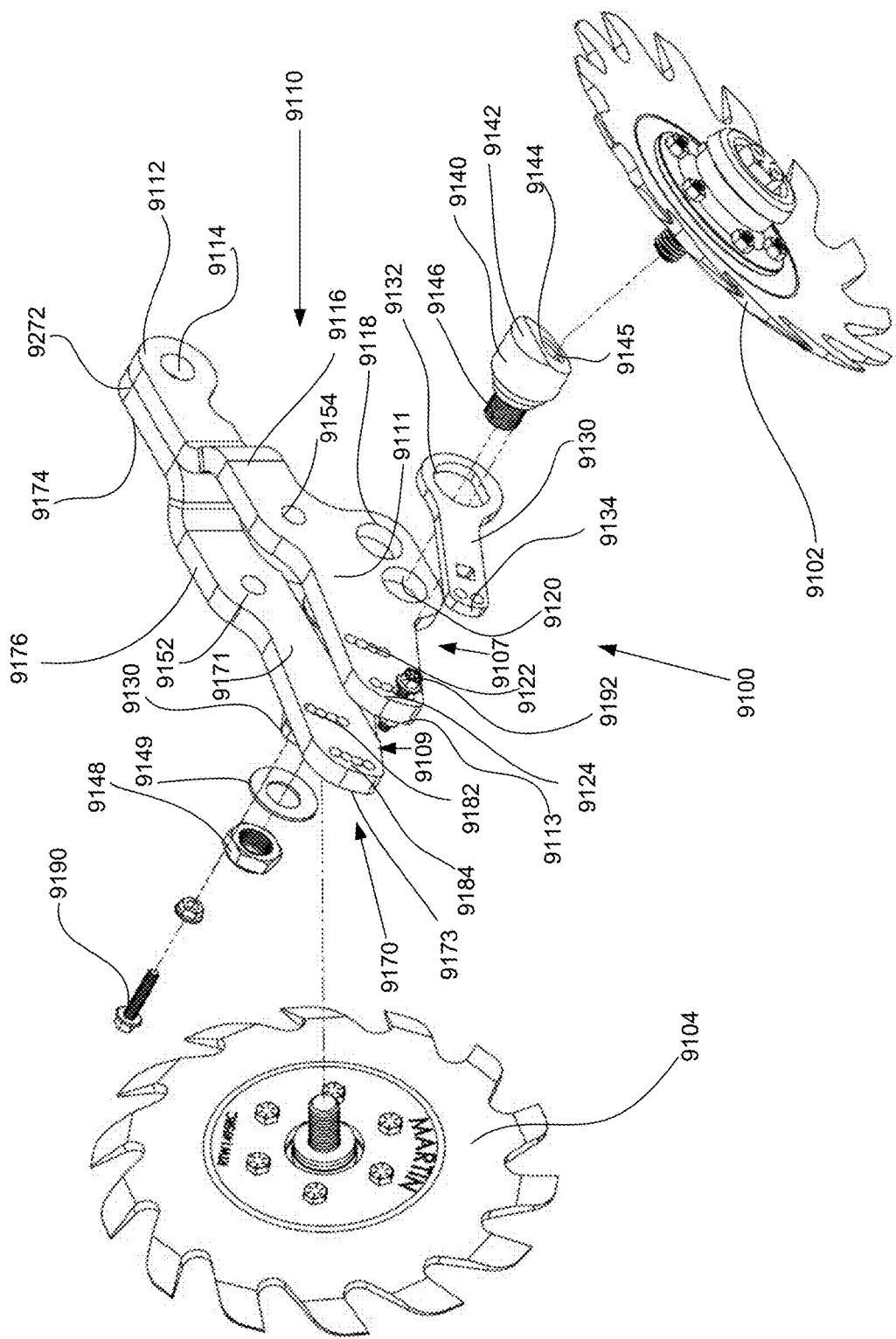

With reference now to FIGS. 11-13, views of the first stage closing unit 9100 are provided. The first stage closing unit 9100 may be similar to the closing wheel frame assembly 7000 shown in FIGS. 1-7. Like the closing wheel frame assembly 7000 of FIGS. 1-7, the first stage closing unit 9100 shown in FIGS. 11-13 is a row closer that may be used beneath a row unit or row unit frame 9300. The first stage closing unit 9100 comprises a first frame 9110 and second frame 9170 to which respective closing wheel assemblies 9102 and 9104 are mounted.

The first frame 9110 of the first stage closing unit 9100 comprises a proximal or mounting end 9112 in which an opening or mounting means 9114 is disposed such that the first frame may be pivotally or movably secured to the row unit 9300. A bend 9116 positions the body 9111 and distal ends 9113 of the frame 9110 such that the biasing means 9150 (e.g., suspension or fluid actuator) may be secured to the opening or mounting means 9154 at the interior of the frame 9110 and between the frames 9110 and 9170. A set of wheel hub mounting positions 9118 and 9120 are provided on the body 9111 of the frame 9110. The set of wheel hub mounting positions 9118 and 9120 provide for the mounting of a hub for a closing wheel to be installed in either position, such that a pair of closing wheels may be used in either an opposite or offset mount configuration. A first set of lever arm securing points 9122 and a second set of lever arm securing points 9124 at the distal end 9113 of the frame 9110 provide for the securing of a lever arm 9130 when the closing wheel (e.g., closing wheel and hub 9102) is installed in either of the mounting positions 9118 or 9120.

The second frame 9170 of the first stage closing unit 9100 comprises a proximal or mounting end 9172 in which an opening or mounting means 9174 is disposed such that the second frame may be pivotally or movably secured to the row unit 9300. A bend 9176 positions the body 9171 and distal ends 9173 of the frame 9170 such that the biasing means 9150 (e.g., suspension or fluid actuator) may be secured to the opening or mounting means 9152 at the interior of the frame 9170 and between the frames 9110 and 9170. A set of wheel hub mounting positions 9178 and 9180 are provided on the body 9171 of the frame 9170. The set of wheel hub mounting positions 9178 and 9180 provide for the mounting of a hub for a closing wheel to be installed in either position, such that a pair of closing wheels may be used in either an opposite or offset mount configuration. A first set of lever arm securing points 9182 and a second set of lever arm securing points 9184 at the distal end 9173 of the frame 9170 provide for the securing of a lever arm 9130 when the closing wheel (e.g., closing wheel and hub 9104) is installed in either of the mounting positions 9178 or 9180. The frames 9110 and 9170 may comprise a set of cutouts or reliefs 9107 and 9109 to prevent the closing wheels 9102 and 9104 from contacting the frames when the toe in or angle of the wheels is adjusted to a relatively high angle.

A lever arm 9130 with a hub 9140 comprise the linkage mechanism and may be used with either the first 9110 or second 9170 frames to secure and adjust the angle or "toe in" of the respective closing wheel and hub assemblies 9102 and 9104. This is the toe in angle orientation of the closing wheels. The lever arm 9130 comprises a set of securing means or points 9134 which may be a set of openings, and a hub opening 9132 that may be shaped or keyed to matingly fit about the exterior of the hub 9140. The hub 9140 comprises a body having an outer face 9142 that is substantially parallel to the closing unit frame (e.g., frame 9110 or 9170), an angled mounting face 9144 having an opening 9145 adapted to receive and secure, such as by a set of threads or threaded insert, the closing wheel and hub assembly 9102 or 9104. Threaded stud or mounting portion 9145 is inserted into one of the wheel hub mounting positions and secured by a fastener such as the nut 9148 and washer 9149. Moving the arm of the lever arm 9130 increases or decreases the amount of "toe in" or toe in angle orientation of the closing wheel. As the arm of the lever arm 9130 is raised, the amount of toe in increases and when it is lowered the amount of toe in decreases. The lever arm 9130 operates on the hub 9140 to move or adjust the position of the face 9144 such that the angle of the closing wheel changes with the rotation of the hub 9140 and lever arm 9130. The lever arm 9130 may be secured by the securing means or fasteners 9190 and 9192 when used on the respective frames 9170 and 9110.

As shown in FIGS. 12 and 13, the closing wheels 9102 and 9104 are installed in an offset configuration and the lever arms 9130 are secured and positioned in the lowest position setting such that the closing wheels 9102 and 9104 have the lowest or least amount of toe in. The lever arms 9130 of the linkage mechanism may be raised and secured in a higher position to increase the toe in of the wheels 9102 and 9104. The closing wheels 9102 and 9104, and the closing wheels 7010 and 7020 shown in FIGS. 1-4, are disposed or angled in a V-shaped orientation which is the closing angle orientation. The closing wheels 9102 and 9104 are not angled parallel to the frames 9110 and 9170 and are not angled perpendicular to the surface of the soil. Being installed on the angled face (e.g., face 9144) of the hub orients the wheels at an angle to the frame and the soil surface such that the wheels 9104 and 9102 form a "V" shape. In this orientation the closing wheels 9102 and 9104 operate effectively on the soil on either side of a furrow or seed trench to effectively close the furrow about a seed in the furrow. The V-shaped orientation provides a significant benefit over an orientation parallel to the frame as it provides for a more effective closing action in more soil conditions. The V-shaped orientation is the closing angle orientation of the wheels and is the relative angle of the wheels to the ground. The closing angle orientation is not an angle perpendicular to the ground, and the V-shaped orientation is an improvement over prior art closing angles that were perpendicular to the ground. The angled face 9144 of the hub 9140 provides for this angled orientation of the closing wheels 9102 and 9104 relative to the frame and soil.

Soils that are high in moisture, which are typical in no tilling or no till farming operations, are particularly hard to close. These types of soils become waxy and are hard to crumble, thus standard smooth closing wheels and other wheels that are not adjustable simply poke holes or leave a continues ribbon which seals the seed so tightly emergence is delayed if the seed even comes up or emerges at all. Being able to change the toe in to crumble a particular soil type and or at higher moisture levels is especially helpful in covering the seed. The crumbled soil allows the seedling to easily emerge while being hidden from sunlight. If the seed is exposed to sunlight, as in an unclosed or partially closed seed trench with air pockets, the seedling can "leaf out" underground which causes severe retardation in the growth of the plant. The second stage press wheel, e.g. wheel 9210, gently tamps the top of the trench reducing or eliminating air pockets after closing.

Figure 14:
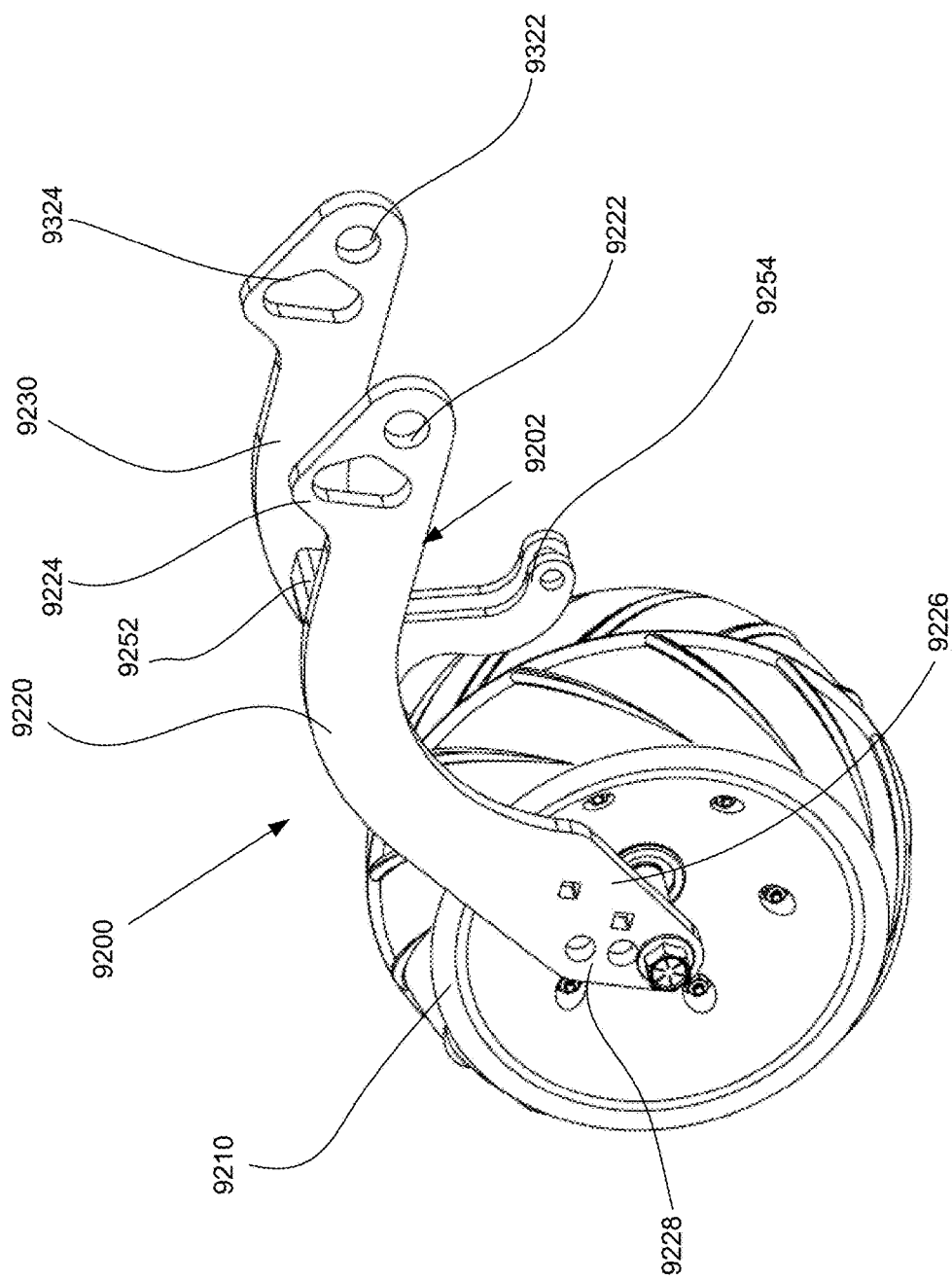

With reference now to FIG. 14, a view of the second stage closing unit 9200 is provided. The second stage closing unit 9200 comprises a swing arm or frame 9202 and a wheel assembly 9210. The wheel 9210 is positioned or installed at the lower end 9226 of the frame 9202 between the first 9220 and second 9230 frame arms at any of the set of mounting points or means (e.g., mounting openings) 9228, and a set of spacers may be used with a bolt or axle to position and secure the wheel 9210. A spacer bar 9252 positions and provides structural support to the arms 9220 and 9230 and provides support and a mounting position for the mount 9254 which is adapted to receive and secure the biasing means 9250. Openings 9224 and 9324 provide for service access to adjustment points or features on the row unit 9300 without requiring the frame 9202 to be removed or repositioned for access to those features. The second stage closing unit 9200 is pivotally or movably mounted or secured to mounting points on the row unit 9300 by the mounting means or openings 9222 and 9322.

In operation the wheel 9210 of the second stage closing unit 9200 follows behind and provides supplemental closing action to the closing wheels 9102 and 9104 of the first stage closing unit. The first 9100 and second 9200 stage closing units may be used with no additional down pressure (i.e., only the weight of the closing units) or may be further biased by additional down pressure from the respective biasing means 9150 and 9250. The down pressure may be adjusted as necessary to adapt to changing soil and terrain conditions to provide for optimal row closing action and soil engagement. This may include increasing down pressure in dry conditions and decreasing down pressure in wet conditions to prevent over or under-engagement with the soil and to prevent air pockets from forming about planted seeds in the seed trench or furrow.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

It should be noted that the present systems and/or methods are not limited to the specific embodiments described herein, but is intended to apply to all similar systems and/or methods for removing debris and/or providing a certain amount of tilling. Modifications and alterations from the described embodiments will occur to those skilled in the art without departure from the spirit and scope of the present systems and/or methods. It should be noted that the present invention is not limited to the specific embodiments pictured and described herein but is intended to apply to all similar methods for ground surface penetration during operation of planter, seeder or drill unit. Accordingly, modifications and alterations from the described embodiments will occur to those skilled in the art without departure from the spirit and scope of the present invention, the scope of which is only limited by the appended claims that follow.

What is claimed is:

1. A row planting unit closing system, the system comprising:
   a first stage closing unit adapted to be attached to a row planting unit and comprising:
   a first stage closing wheel frame secured to a row planting unit; and
   a set of at least one row closing wheel having a closing angle orientation non-perpendicular relative to the ground; and
   wherein the first stage closing wheel frame is attached at a first end to the row planting unit, the first closing wheel stage frame comprising a linkage mechanism for setting a toe in angle orientation of the set of at least one row closing wheel relative to the first stage closing wheel frame.

2. The system of claim 1, wherein the linkage mechanism comprises at least one lever secured to a row closing wheel hub adapted to provide an adjustable toe in orientation of the set of at least one row closing wheel.

3. The system of claim 2, wherein the hub comprises a first face relatively parallel to the frame and a second face disposed at an angle relative to the first face.

4. The system of claim 3, wherein the second face of the hub is adapted to support a row closing wheel from the set of at least one row closing wheel.

5. The system of claim 1, wherein the set of at least one row closing wheel comprises a first and second row closing wheel, the first and second row closing wheels being configured to provide a V-shape closing angle orientation relative to the ground.

6. The system of claim 5, wherein the first and second row closing wheels operate on opposite sides of a furrow to cause a closing action on the furrow by compression of soil on the opposite sides of the furrow.

7. The system of claim 2, further comprising wherein repositioning of the at least one lever of the linkage mechanism results in re-orientation of the set of at least one row closing wheel relative to the frame to effect a change in the toe in angle orientation.

8. The system of claim 2, wherein the first stage frame further comprises: a set of securing points for securing the lever in a desired position; and a plurality of mounting points for mounting the linkage mechanism and the set of at least one row closing wheel.

9. The system of claim 1, wherein the closing wheel frame includes a plurality of locking points and wherein both the toe in angle orientation and the closing angle orientation are fixable at a plurality of positions corresponding to the plurality of locking points.

10. The system of claim 1, wherein one or both of the toe in angle orientation and the closing angle orientation are adjustable.

11. The system of claim 1, wherein the toe in angle orientation is adjustable and wherein the first stage frame further comprises a set of cutouts for preventing the set of at least one row closing wheel from contacting the first stage frame when the toe in angle orientation is adjusted.

12. The system of claim 1, wherein the first stage frame further comprises a set of suspension mounting points for securing and supporting a first stage frame biasing mechanism.

13. The system of claim 1, further comprising wherein the first stage frame is pivotally mounted to the row planting unit at the first end and is disposed beneath the row planting unit.

14. The system of claim 1, wherein the first stage frame comprises a first frame member and a second frame member, each of the first frame member and the second frame member having a first end proximate the row planting unit and commonly secured at the respective first ends to the row planting unit, and wherein the first frame member and the second frame member each comprise an angled portion such that distal ends of the respective first and second frame members are separated.

15. The system of claim 1 further comprising a second stage closing unit comprising a second stage frame and a second stage closing wheel.

16. The system of claim 15, wherein the second stage frame is adapted to support the second stage closing wheel and further comprises a set of cutouts adapted to permit access to a set of features on the row planting unit.

17. The system of claim 15, wherein the second stage frame further comprises a set of parallel frame arms and a suspension mount, the suspension mount adapted to transfer force from a biasing mechanism to the second stage closing wheel.

* * * * *